(12) United States Patent
Yatsugi et al.

(10) Patent No.: US 11,731,891 B2
(45) Date of Patent: Aug. 22, 2023

(54) ORGANIC WASTEWATER TREATMENT APPARATUS

(71) Applicant: Kubota Corporation, Osaka (JP)

(72) Inventors: Soichiro Yatsugi, Hyogo (JP); Shinya Nagae, Hyogo (JP); Hitoshi Yanase, Hyogo (JP)

(73) Assignee: Kubota Corporation, Osaka (JP)

( * ) Notice: Subject to any disclaimer, the term of this patent is extended or adjusted under 35 U.S.C. 154(b) by 141 days.

(21) Appl. No.: 17/210,187

(22) Filed: Mar. 23, 2021

(65) Prior Publication Data

US 2021/0206677 A1 Jul. 8, 2021

Related U.S. Application Data

(63) Continuation of application No. PCT/JP2019/037264, filed on Sep. 24, 2019.

(30) Foreign Application Priority Data

Oct. 4, 2018 (JP) .................... 2018-189232

(51) Int. Cl.
*C02F 3/30* (2023.01)
*C02F 3/12* (2023.01)
*C02F 11/04* (2006.01)

(52) U.S. Cl.
CPC .............. *C02F 3/302* (2013.01); *C02F 3/121* (2013.01); *C02F 3/1273* (2013.01); *C02F 11/04* (2013.01);

(Continued)

(58) Field of Classification Search
CPC ........ C02F 3/121; C02F 3/1273; C02F 3/302; C02F 2203/006; C02F 2301/046; C02F 2301/08; C02F 3/1268
(Continued)

(56) References Cited

U.S. PATENT DOCUMENTS 5,234,595 A * 8/1993 DiGregorio ............. C02F 3/302
210/194

FOREIGN PATENT DOCUMENTS

CN 205313183 U * 6/2016
JP 08-010793 1/1996
(Continued)

OTHER PUBLICATIONS

International Search Report from International Application No. PCT/JP2019/037264 dated Dec. 17, 2019.

*Primary Examiner* — Claire A Norris
(74) *Attorney, Agent, or Firm* — Beyer Law Group LLP

(57) ABSTRACT

An organic wastewater treatment apparatus biologically treats organic wastewater containing nitrogen using a treatment tank storing activated sludge. A top-bottom partition member divides the treatment tank in into an upper space and a lower space. A plurality of anoxic tanks are formed in the lower space, while a plurality of aerobic tanks, each of which having an immersion-type membrane separation device, are formed in the upper space. A raw water supply path divides and supplies the organic wastewater to each anoxic tank. A plurality of denitrifying liquid transfer paths repeatedly transfers the activated sludge from the anoxic tanks to the aerobic tanks, while a plurality of nitrifying liquid transfer paths repeatedly transfer the activated sludge from the aerobic tanks to the anoxic tanks, whereby the activated sludge is circulated throughout the treatment tank.

1 Claim, 18 Drawing Sheets

(52) U.S. Cl.
CPC .. *C02F 2203/006* (2013.01); *C02F 2301/046* (2013.01); *C02F 2303/06* (2013.01)

(58) Field of Classification Search
USPC ........................................................ 210/605
See application file for complete search history.

(56) References Cited

FOREIGN PATENT DOCUMENTS

| | | |
|---|---|---|
| JP | 09-070597 | 3/1997 |
| JP | 2000-140886 | 5/2000 |
| JP | 2001-327989 | 11/2001 |
| JP | 2004-261711 | 9/2004 |
| JP | 2004-305916 | 11/2004 |
| JP | 2004-322084 | 11/2004 |
| JP | 2016-140783 | 8/2016 |

\* cited by examiner

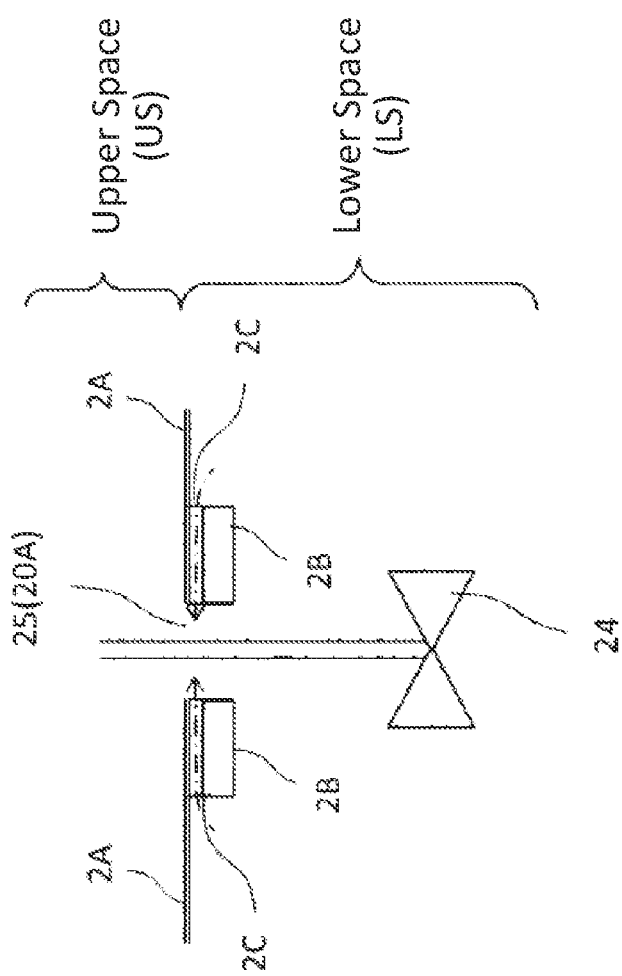

ORGANIC WASTEWATER TREATMENT APPARATUS

CLAIM OF PRIORITY

This application is a Continuation of International Patent Application No. PCT/JP2019/037264, filed on Sep. 24, 2019, which claims priority to Japanese Patent Application No. 2018-189232, filed on Oct. 4, 2018, each of which is hereby incorporated by reference.

BACKGROUND OF THE INVENTION

1. Field of the Invention

The present invention relates to an organic wastewater treatment apparatus for biologically treating organic wastewater containing nitrogen and phosphorus in a treatment tank in which activated sludge is stored.

2. Description of the Related Art

Conventionally, a circulating-type anaerobic-aerobic method (also referred to as the A2O method (or UCT method)) has been widely adopted as a method for biologically treating organic wastewater containing nitrogen and phosphorus using activated sludge, which employs an anaerobic tank, an anoxic tank(s), and an aerobic tank(s) provided in this order, such that sludge from the aerobic tank is circulated to the anaerobic tank(s) and the anoxic tank(s). In recent years, the MBR (Membrane Bio Reactor) method (e.g., UCT-MBR), in which a membrane separation device is immersed in the aerobic tank in place of a settling tank for solid-liquid separation, has attracted attention.

Japanese Patent Publication No. 2000-140886 discloses a compactly-build treatment facility for nitrogen-containing wastewater having a nitrogen removal rate of 90% or more. The treatment facility includes a plurality of anaerobic tanks and aerobic tanks, which are alternately connected in series in the order of anaerobic tank and aerobic tank, and a supply path for supplying the nitrogen-containing wastewater to the anaerobic tanks in the first stage and at least one of the second and subsequent stages. The aerobic tank in the last stage includes an immersion-type separation device for separating the activated sludge to obtain treated liquid, and the treatment facility is provided with a flow path for returning the activated sludge from the last-stage aerobic tank to the first-stage anaerobic tank. Precisely speaking, the anaerobic tank of the treatment facility functions as an anoxic tank.

Japanese Patent Publication No. 2004-305916 discloses a membrane separation apparatus that performs an advanced treatment process using a single treatment tank. The membrane separation apparatus includes an endless-type treatment tank for biologically treating water to be treated, in which the water to be treated forms a swirling flow, a plurality of membrane units for membrane-separating the water to be treated, which are installed in the swirling flow at intervals in the flow direction, and a raw water tank for storing the water to be treated, from which the water to be treated is supplied to the treatment tank. The raw water tank is installed inside the swirling flow, and the apparatus further includes a supply means for supplying the water to be treated from the raw water tank to the treatment tank in multiple stages along the flow direction of the swirling flow.

In any of the above-described wastewater treatment facilities, since the organic wastewater is supplied to an anaerobic treatment region formed adjacent to an aerobic treatment region in which each separation membrane is immersed, a high denitrification performance can be realized in the anaerobic treatment region under high BOD (Biochemical Oxygen Demand) concentration.

In addition, Japanese Patent Publication No. 2001-327989 proposes an apparatus for treating wastewater containing organic solids, which includes a decomposition treatment tank and a sedimentation separation tank, where the decomposition treatment tank includes an anaerobic decomposition treatment tank, and an aerobic decomposition treatment tank provided above and integrated with the anaerobic decomposition tank. According to such a treatment apparatus, the installation area of the treatment tank can be reduced.

BRIEF DESCRIPTION OF THE INVENTION

FIG. 12 shows an organic wastewater treatment apparatus 1 in which the water depth of an anoxic tank 10 and an aerobic 20 tank is significantly increased from the usual 4 to 5 meters to about 8 to 10 meters as one of the measures to reduce the installation area of the MBR facility described above.

In such an organic wastewater treatment apparatus 1, however, if membrane separation devices 30 should be installed in the aerobic tank 20 having such a deep water depth, the power of aeration for cleaning the membrane would also be increased, compared to a general design value (i.e., the design value for the normal water depth of 4-5 m). Accordingly, in order to avoid inefficiency, it is necessary to use another shallow water tank 20C for installing the membrane separation devices.

In addition, since the pressure increase by a blower is limited, it is necessary to install diffusers 40 in a middle position of the aerobic tank 20 at a several meters above the bottom of the tank, such that the diffusers 40 generate an upward flow in the sludge, which turns into a downward flow returning to the diffusers 40 so as to form a swirling flow. In addition, in order to secure a predetermined speed of the swirling flow, the diffusers 40 must be installed with a gap therebetween in the horizontal direction in a space which is partitioned off from the aerobic tank 20 by a baffle plate 20B, as shown in FIG. 12.

However, if the apparatus is designed under the condition in which the MLSS (Mixed Liquor Suspended Solids) concentration is increased to that of general MBRs, there would be insufficient space for installing the diffusers. In addition, in order to perform maintenance for the diffusers installed in the middle position of the tank, it would be necessary to assemble a temporary scaffold in the treatment tank, which makes the maintenance operation more complicated.

The purpose of the present invention is to provide an organic wastewater treatment apparatus using the MBR method, which is easy to perform maintenance and other operation, while reducing the installation area.

In order to achieve the above-mentioned purpose, a first characteristic configuration of an organic wastewater treatment apparatus according to the present invention is that the organic wastewater treatment apparatus biologically treats organic wastewater containing nitrogen in a treatment tank in which activated sludge is stored, wherein the apparatus includes (a) a top-bottom partition member for dividing the treatment tank in a vertical direction into an upper space and a lower space, (b) a plurality of anoxic tanks formed in the lower space of the treatment tank, (c) a plurality of aerobic tanks formed in the upper space of the treatment tank, each aerobic tank being provided with an immersion-type membrane separation device, (d) a raw water supply path for dividing and supplying the organic wastewater to each of the plurality of anoxic tanks, (e) a plurality of denitrifying liquid transfer paths for transferring the activated sludge from the anoxic tanks to the aerobic tanks, and (f) a plurality of nitrifying liquid transfer paths for transferring the activated sludge from the aerobic tanks to the anoxic tanks. The organic wastewater treatment apparatus is configured to repeatedly transfer the activated sludge from the anoxic tanks to the aerobic tanks via the denitrifying liquid transfer paths, and from the aerobic tanks to the anoxic tanks via the nitrifying liquid transfer paths, such that the activated sludge circulates throughout the treatment tank.

By dividing the treatment tank storing the activated sludge into the upper space and the lower layer space by the top-bottom partition member, and arranging the plurality of anoxic tanks in the lower space, while arranging the plurality of aerobic tanks having the immersion-type membrane separation devices in the upper space, a small installation area of the organic wastewater treatment apparatus can be realized without causing an increase in the aeration load required for the aerobic tanks.

The organic wastewater, which is divided and supplied from the raw water supply path to each anoxic tank and mixed with the activated sludge, is denitrified in the anoxic tank, transferred to each aerobic tank via the corresponding denitrifying liquid transfer path, nitrified in the aerobic tank, and then transferred to another anoxic tank via the corresponding denitrifying liquid transfer path, thereby circulating through the entire treatment tank such that nitrification and denitrification processes are repeated. The organic wastewater is then withdrawn as treated water from the membrane separation devices.

A second characteristic configuration of the organic wastewater treatment apparatus according to the present invention is that, in addition to the first characteristic configuration described above, the plurality of anoxic tanks and the plurality of aerobic tanks have the same shape with the top-bottom partition member interposed therebetween.

Since partition walls between the plurality of aerobic tanks arranged in the upper space and partition walls between the plurality of anoxic tanks arranged in the lower space are installed in the same position in plan view, the construction of the treatment tank becomes easier.

A third characteristic configuration of the organic wastewater treatment apparatus according to the present invention is that, in addition to the first and/or second characteristic configuration described above, the apparatus further includes an anaerobic tank for anaerobically treating the organic wastewater supplied from the raw water supply path, a plurality of denitrifying liquid return paths for transferring the activated sludge from each anoxic tank to the anaerobic tank, and a plurality of distribution paths for dividing and supplying the activated sludge from the anaerobic tank to the plurality of anoxic tanks.

By providing the anaerobic tank, even organic wastewater containing phosphorus can be effectively dephosphorized. In other words, phosphorus is efficiently discharged from the activated sludge in the anaerobic tank, by transferring the activated sludge which has excessively absorbed phosphorus in the aerobic tanks, from the anoxic tanks to the anaerobic tank through the denitrifying liquid return paths. The activated sludge is then transferred to the anoxic tanks through the distribution paths, and then to the aerobic tanks, in which phosphorus is excessively absorbed by the activated sludge, whereby the phosphorus concentration in the treated water after passing through the membrane separation devices becomes very low.

A fourth characteristic configuration of the organic wastewater treatment apparatus according to the present invention is that, in addition to any of the first through third characteristic configurations described above, the anaerobic tank is disposed in the center of the treatment tank across the upper and lower spaces.

By arranging the anaerobic tank in the center of the treatment tank, the equally-dividing distribution paths and the denitrifying liquid return paths which connect the anaerobic tank and the plurality of anoxic tanks may have the same and shortest length, thereby realizing the organic wastewater treatment apparatus having a small installation area as a whole.

A fifth characteristic configuration of the organic wastewater treatment apparatus according to the present invention is that, in addition to any of the first to fourth characteristic configurations described above, the treatment apparatus further includes beam members provided on a lower surface of the top-bottom partition member, each nitrifying liquid transfer path has an inlet provided on an upper surface of the anoxic tank, and each beam member has a through-hole such that gas generated in the anoxic tank is released through the nitrifying liquid transfer path.

Accordingly, it is possible to prevent gas and the like from filling a space directly below the top-bottom partition member, which is portioned by the top-bottom partition member and the underpinning beam members, thereby avoiding a decrease in an effective volume of the anoxic tank and a deterioration of the water quality.

As explained above, in accordance with the present invention, it is possible to provide an organic wastewater treatment apparatus using the MBR method, which is easy to perform maintenance and other operations, while reducing the installation area.

BRIEF DESCRIPTION OF THE DRAWINGS

FIG. 10B is an explanatory diagram illustrating details of the support structure of the top-bottom partition member.

DETAILED DESCRIPTION OF EMBODIMENTS OF THE INVENTION

Figure 1:
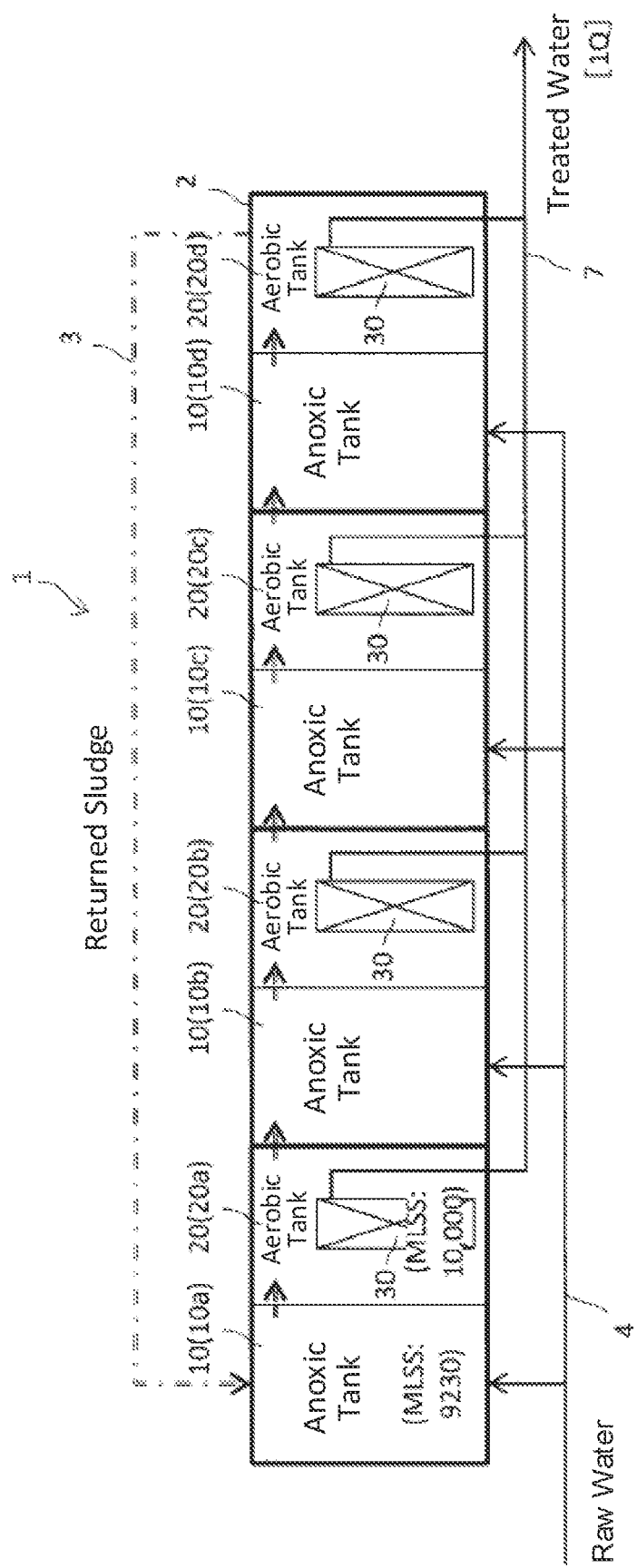
FIG. 1 is an explanatory diagram conceptually illustrating a wastewater treatment apparatus for treating organic wastewater containing nitrogen.

Hereinafter, embodiments of the organic wastewater treatment apparatus according to the present invention will be described referring to the drawings. The wastewater treatment apparatus according to the present invention is an organic wastewater treatment apparatus in which organic wastewater containing nitrogen is biologically treated in activated sludge.

FIG. 1 illustrates a basic concept of the organic wastewater treatment apparatus in accordance with one embodiment of the present invention. The wastewater treatment apparatus 1 includes a biological treatment tank 2 in which a plurality of biological treatment units are connected in series, where each biological treatment unit is formed of a pair an anoxic tank 10 (one of 10a, 10b, 10c, 10d) disposed on an upstream side and an aerobic tank 20 (corresponding one of 20a, 20b, 20c, 20d) disposed on a downstream side along a flow of organic wastewater (also referred to as "raw water") containing nitrogen.

The anoxic tank 10 (one of 10a, 10b, 10c, 10d) is disposed on an upstream side along a flow of organic wastewater (also referred to as "raw water") containing nitrogen, while the aerobic tank 20 (corresponding one of 20a, 20b, 20c, 20d) is disposed on a downstream side along the flow of the raw water, and provided with a membrane separation device 30 immersed in the activated sludge.

The wastewater treatment apparatus 1 further includes a sludge return path 3 for returning the activated sludge from the aerobic tank 20d disposed on the most downstream side to the anoxic tank 10a disposed on the most upstream side, a raw water introduction path 4 for dividing and supplying the organic wastewater to the anoxic tanks 10 (10a, 10b, 10c, 10d), and a treated water discharge path 7 for discharging membrane-permeated liquid from the membrane separation devices 30 of the biological treatment units as treated water.

According to the wastewater treatment apparatus 1, nitrate-nitrogen, which has been nitrified from ammoniacal nitrogen in the aerobic tanks 20, is reduced to nitrogen in the anoxic tanks 10, an effective denitrification process can be achieved.

Figure 2:
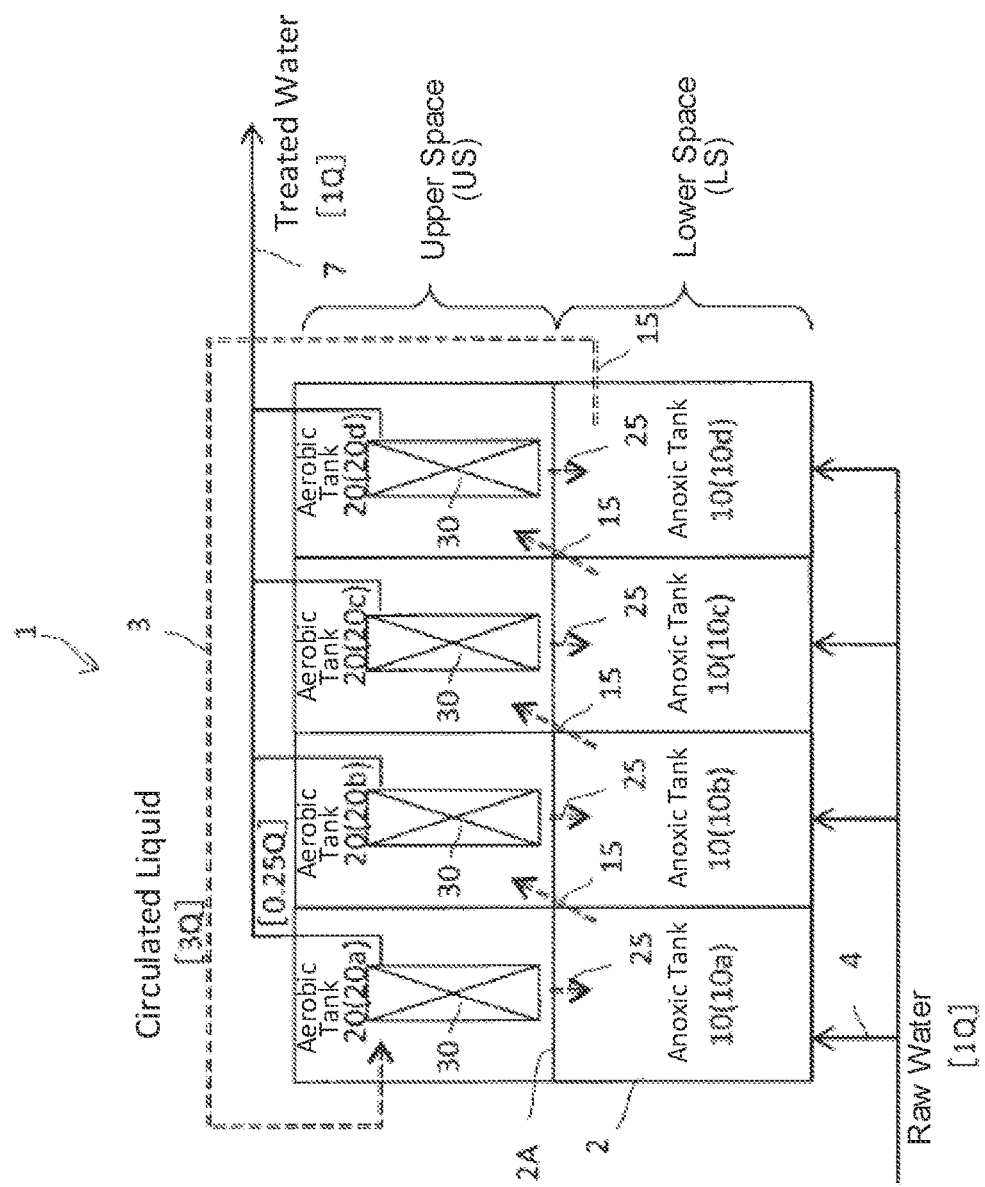
FIG. 2 is an explanatory diagram illustrating an overview of the wastewater treatment apparatus according to one embodiment of the present invention, by showing a front view thereof.

As shown in FIG. 2, an organic wastewater treatment apparatus 1 according to one embodiment of the present invention is the organic wastewater treatment apparatus for biologically treating organic wastewater containing nitrogen using a treatment tank 2 in which activated sludge is stored. The treatment tank is provided with a top-bottom partition member 2A which vertically divides the treatment tank 2 into an upper space US and a lower space LS.

The lower space LS of the treatment tank 2 is formed into a plurality of anoxic tanks 10 (10a, 10b, 10c, 10d), and the upper space US of the treatment tank 2 is formed into a plurality of aerobic tanks 20 (20a, 20b, 20c, 20d) each provided with an immersion-type membrane separation device 30.

The wastewater treatment apparatus 1 further includes a raw water supply paths 4 for dividing and supplying the organic wastewater to each anoxic tank 10, a plurality of denitrifying liquid transfer paths 15 for transferring activated sludge from the anoxic tanks 10 to the aerobic tanks 20, and a plurality of nitrifying liquid transfer paths 25 for transferring activated sludge from the aerobic tanks 20 to the anoxic tanks 10.

The wastewater treatment apparatus 1 is configured such that the transfer of activated sludge from the anoxic tanks 10 to the aerobic tanks 20 via the denitrifying liquid transfer paths 15 and the transfer of activated sludge from the aerobic tanks 20 to the anoxic tanks 10 via the nitrifying liquid transfer paths 25 are repeatedly performed, whereby the activated sludge is circulated throughout the treatment tank 2.

By partitioning the treatment tank 2 storing the activated sludge into the upper space and the lower space via the top-bottom partition member 2A, and arranging the plurality of anoxic tanks 10 in the lower space, while arranging the plurality of aerobic tanks 20 having the immersion-type membrane separation devices 30 in the upper space, it has become possible to realize an organic wastewater treatment apparatus having a small installation area without causing an increase in the aeration load required for the aerobic tanks 20.

As shown in FIG. 2, the organic wastewater, which is divided and supplied from the raw water supply path 4 to each anoxic tank 10 and mixed with the activated sludge, is denitrified in the anoxic tanks 10 and then transferred to the next aerobic tanks 20 through the denitrifying liquid transfer paths 15, such that the organic wastewater is nitrified in the aerobic tanks 20, and then transferred to the adjacent anoxic tanks 10 therebelow through the denitrifying liquid transfer paths 25. As a result, the organic wastewater is repeatedly treated by the nitrification and denitrification processes while circulating throughout the treatment tank 2, and then withdrawn from the membrane separation devices 30 through the treated water discharge path 7 as treated water.

Figure 11A:
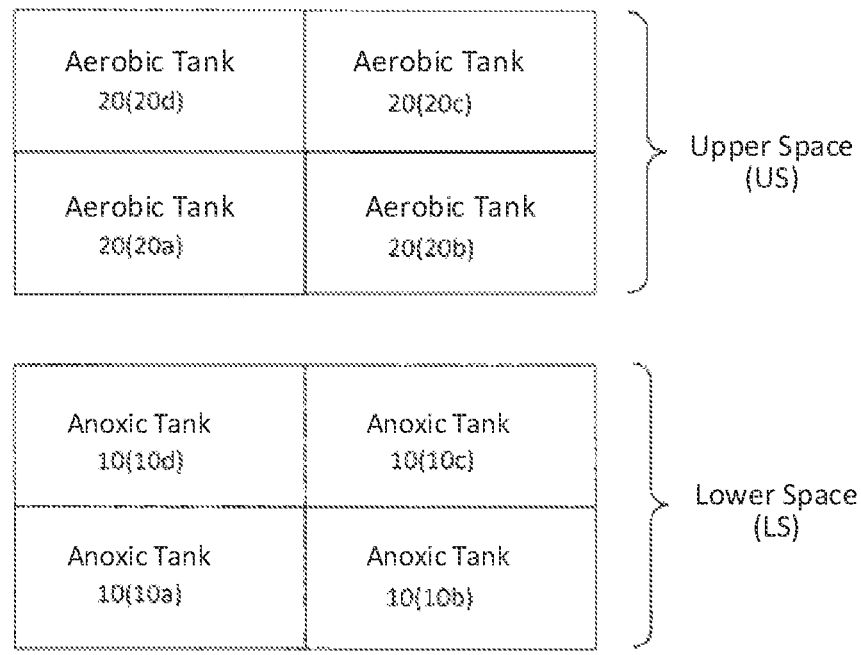
FIG. 11A is an explanatory diagram illustrating a layout of the upper and lower spaces in accordance with one embodiment of the present invention.

As shown in FIG. 11A, in the present embodiment, the organic wastewater treatment apparatus 1 is formed with a plurality of anoxic tanks 10 in the lower space LS, and a plurality of aerobic tanks 20 in the upper space US, both of which are partitioned by walls into the same shape in plan view across the top-bottom partition members 2A. Accordingly, the partition walls of the plurality of aerobic tanks 20 arranged in the upper space US and that of the plurality of anoxic tanks 10 arranged in the lower space LS are installed in the same position in plan view, which makes the organic wastewater treatment apparatus 1 easy to construct.

Figure 11B:
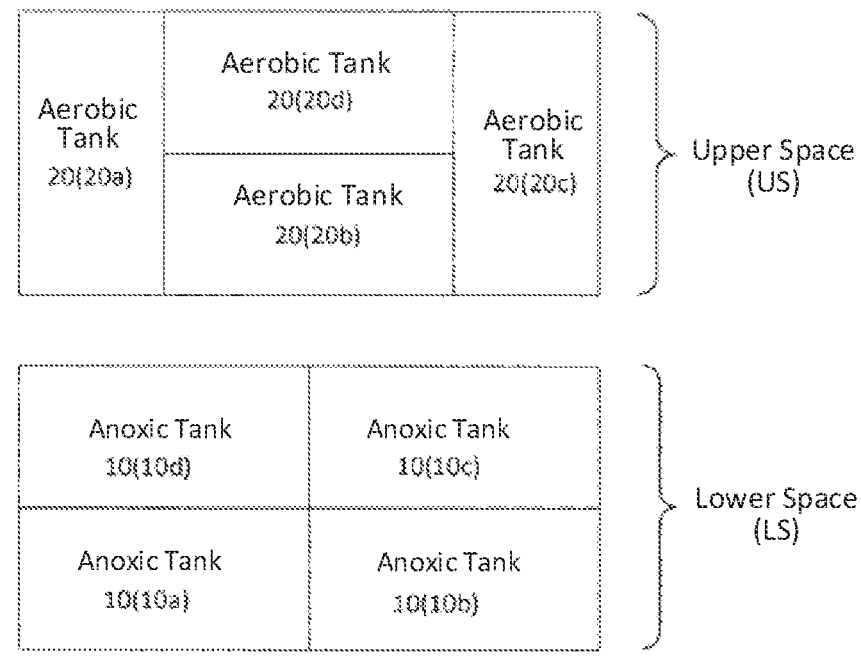
FIG. 11B is an explanatory diagram illustrating a layout of the upper and lower spaces in accordance with another embodiment of the present invention.
Figure 12:
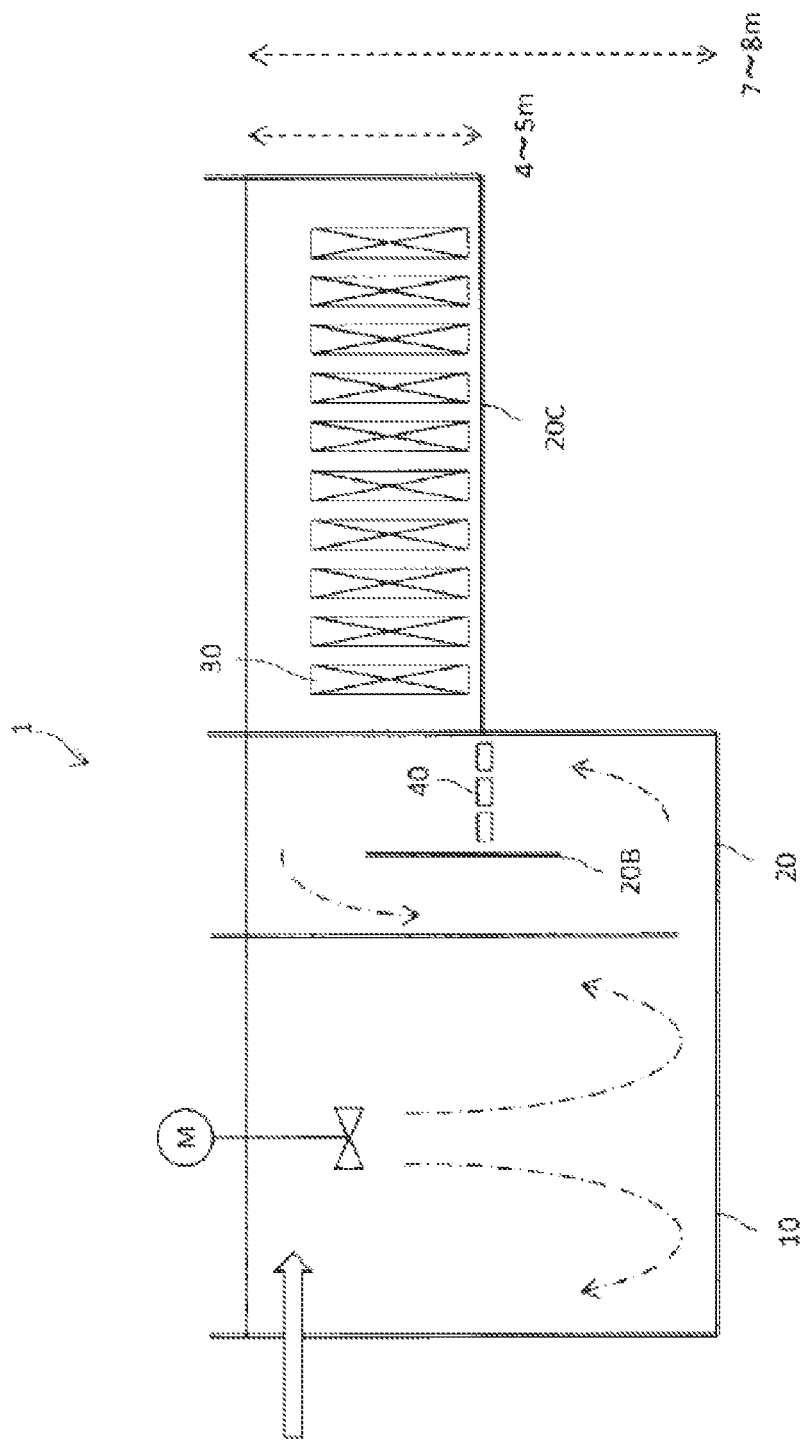
FIG. 12 is an explanatory diagram illustrating a front view of a conventional wastewater treatment apparatus.

Alternatively, as shown in FIG. 11B, the plurality of anoxic tanks 10 and the plurality of aerobic tanks 20 as a whole may be formed in the same shape in plan view across the top-bottom partition member 2A, and a way of partitioning and arrangement of partition walls may be different in the upper space and the lower space. Nevertheless, the small installation area of the organic wastewater treatment apparatus as a whole can still be realized.

Figure 3A:
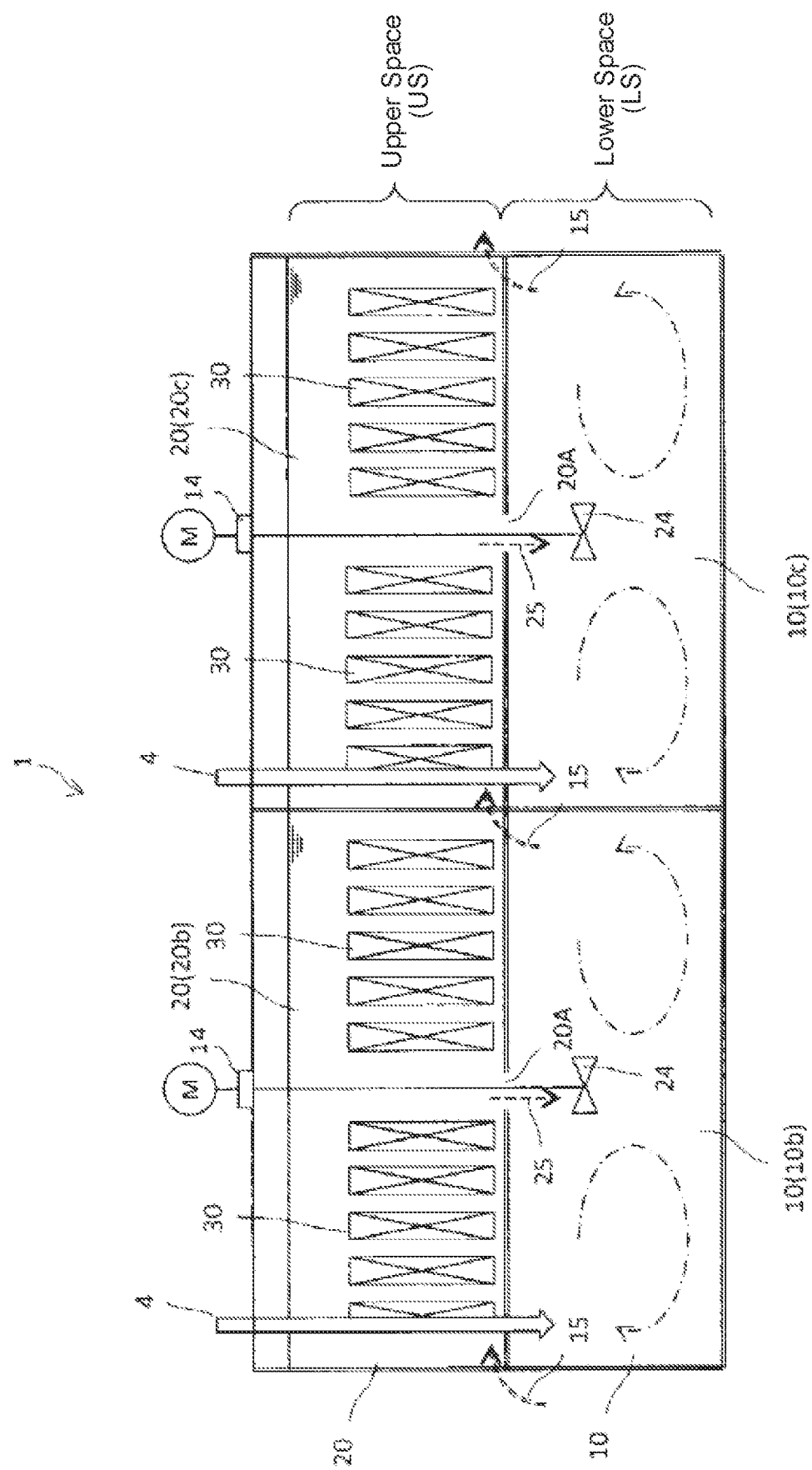
FIG. 3A is an explanatory diagram illustrating a front view of the wastewater treatment apparatus according to one embodiment of the present invention.
Figure 3B:
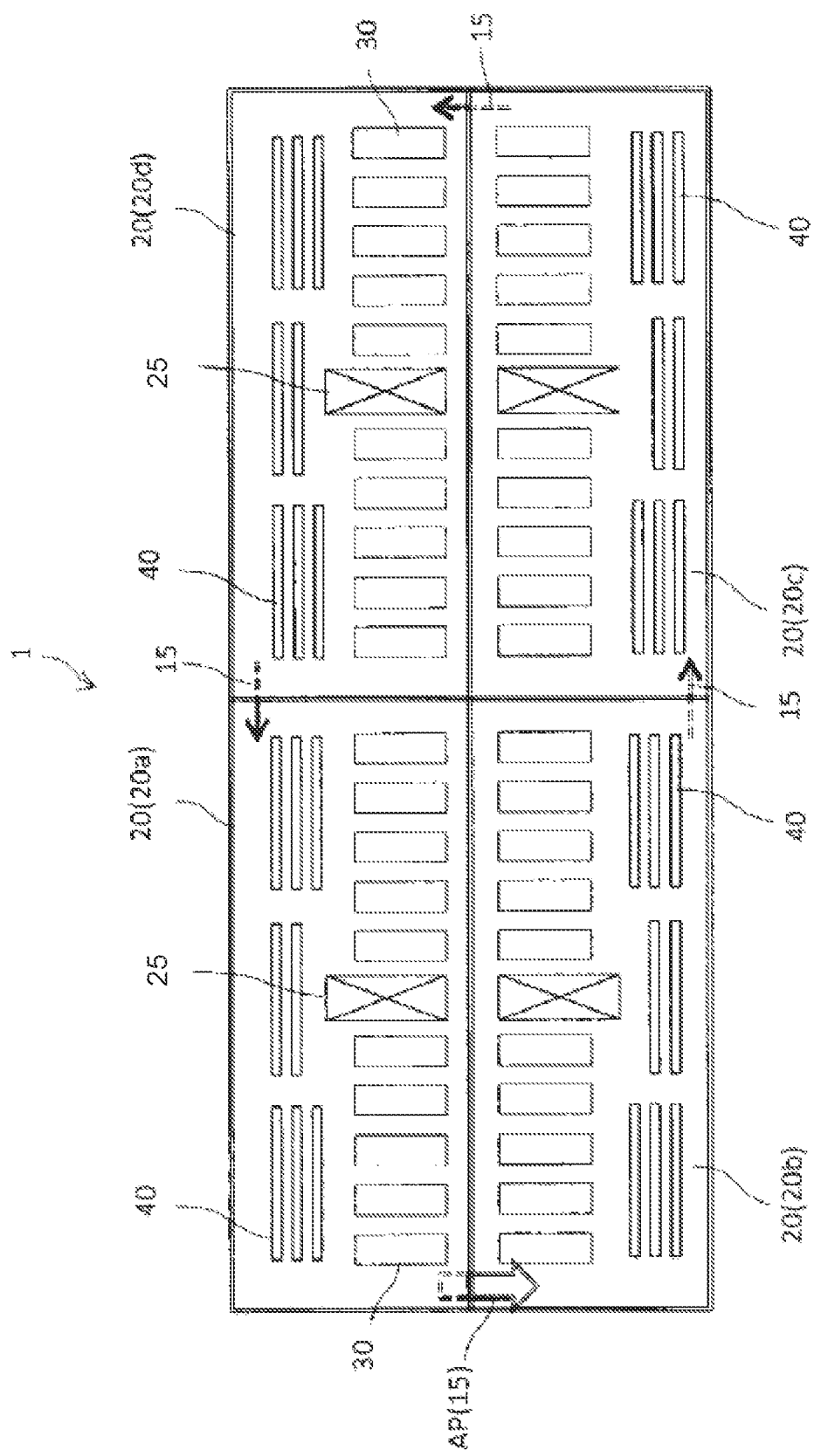
FIG. 3B is an explanatory diagram illustrating a plan view of the wastewater treatment apparatus shown in FIG. 3A.

FIGS. 3A and 3B show more details of the organic wastewater treatment apparatus 1 having such a configuration described above. The organic wastewater, which is supplied from the raw water supply path 4 to the anoxic tanks 10 (10b, 10c, 10d, 10a) formed in the lower space in an air-sealed condition, is mixed with the activated sludge and agitated by agitator blades 24 in an anoxic state so as to undergo a denitrification process. The organic wastewater is then sent to the aerobic tanks 20 (20c, 20d, 20a, 20b) arranged in the upper space above the adjacent anoxic tanks 10 (10c, 10d, 10a, 10b) via the denitrifying liquid transfer paths 15.

One of the denitrifying liquid transfer paths 15 may be provided with an airlift pump AP, and the remaining subsequent denitrifying liquid transfer paths 15 are formed as a duct such that a liquid naturally flows down due to the water pressure difference between the anoxic tanks 10 and the aerobic tanks 20. In addition, or alternatively, the duct may be provided with a circulation pump so as to transfer the mixed liquid of the sludge and the organic wastewater.

In each aerobic tank 20, the membrane separation device 30 is installed by being immersed therein, and an auxiliary diffuser 40 for the aerobic process is installed in the vicinity of the membrane separation device 30, as shown in FIG. 3B. The mixed liquid of the organic wastewater and the activated sludge flows via the denitrifying liquid transfer paths 15 into the aerobic tanks 20 which are partitioned by the top-bottom partition member 2A. Ammoniacal nitrogen is nitrified to nitrate nitrogen under an aerobic condition in the aerobic tanks 20, and then flows out therefrom through an opening 20A formed in the center of the bottom surface of each aerobic tank 20, to the anoxic tanks 10 located directly therebelow. That is, the openings 20A serve as the nitrifying liquid transfer paths 25, as shown in FIG. 3B.

As shown in FIG. 3A, each aerobic tank 20 is covered with a lid having an rectangular opening 14, and an agitator blade 24 is removably attached and inserted through the rectangular opening 14. The agitator blade 24 agitates the raw water and the activated sludge inside the anoxic tank 20. In the figures, the sign M represents a motor which drives the agitation blade 24.

According to the above-mentioned construction, the anoxic tanks 10 are sealed from the air without in contact therewith, thereby increasing the degree of anaerobiosis so as to allow an efficient denitrification treatment process, which also suppresses generation of scum. As a result, not only a defoaming water supply equipment for destroying the scum becomes unnecessary, but also additional membrane separation devices for filtering the defoaming water can be eliminated from the aerobic tanks 20. In addition, a deodorization device for the anoxic tanks 10 is no longer necessary, which also greatly contributes to the reduction of equipment costs.

The top-bottom partition member 2A, which divides the treatment tank 2 into the upper space US and the lower space LS in the vertical direction, may be formed of a reinforced concrete wall in which steel bars are arranged, i.e., a ceiling slab. If transverse beams supporting the ceiling slab are not provided, the resistance to agitation near the ceiling in the anoxic tanks 10 is reduced, whereby the agitation efficiency can be improved.

Figure 10A:
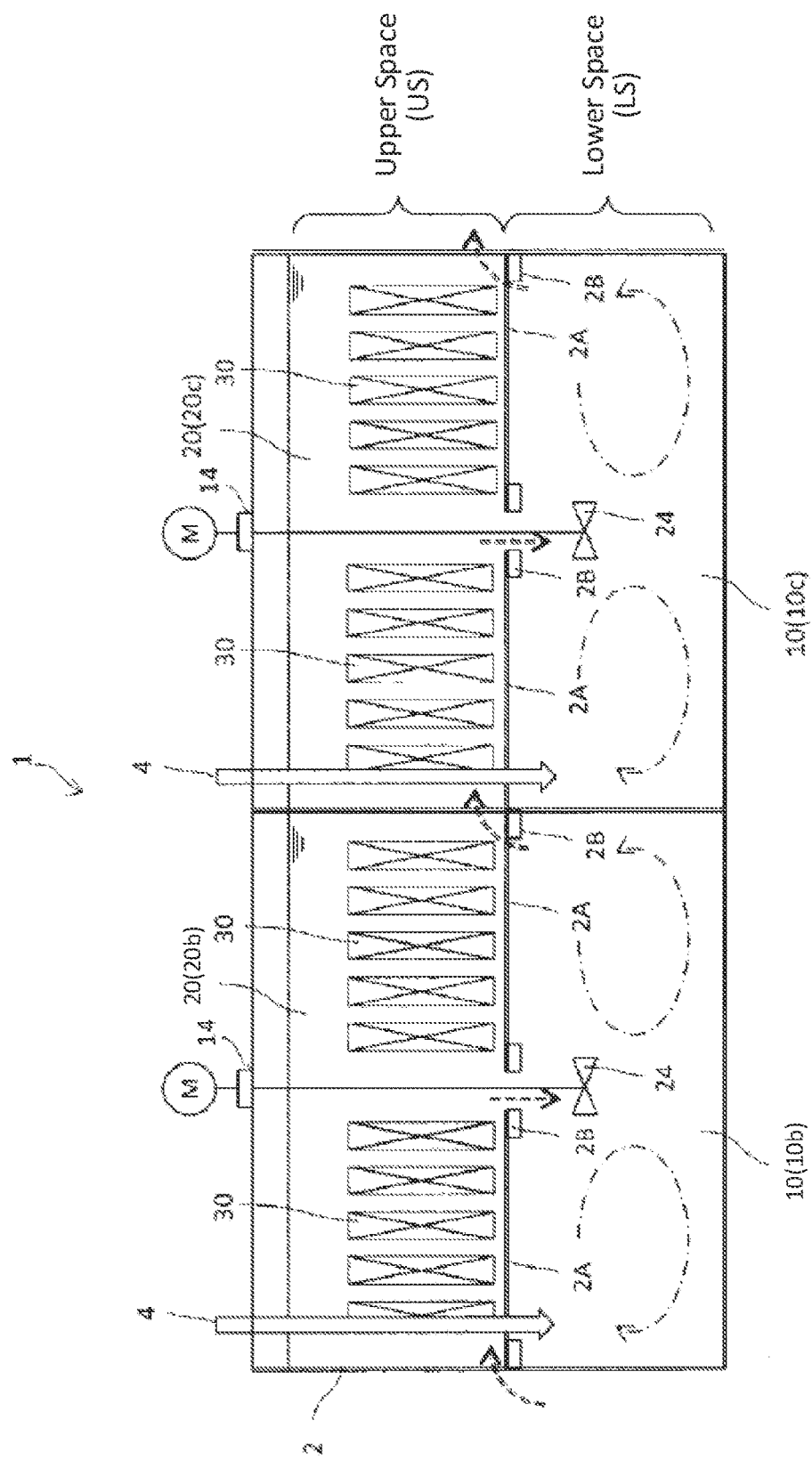
FIG. 10A is an explanatory diagram illustrating an example of a support structure of the top-bottom partition member in accordance with one embodiment of the present invention.

As shown in FIGS. 10A and 10B, when the treatment tank 2 is provided with horizontal beams 2B as beam members, a gas vent hole 2C as a through-hole may be formed in each horizontal beam 2B to allow gases to escape via the gas vent hole 2C and rise through the corresponding opening 20A (i.e., the nitrification liquid transfer path 25 in this embodiment) into the aerobic tank 20 in the upper space US, thereby preventing air and other gases from filling the space directly below the ceiling slab 2A, which is enclosed by the horizontal beam 2B and the ceiling slab 2A. Providing the gas vent holes 2C also avoid accumulating scum in the enclosed space below the ceiling slab 2A. As a result, it is possible to avoid a decrease in an effective volume of the anoxic tanks 10 and a deterioration of the water quality. The nitrogen gas generated in the denitrification process is also released into the aerobic tanks 20 in the upper space US through the openings 20A (nitrifying liquid transfer paths 25).

The membrane separation device 30 is provided with a plurality of membrane elements 31 and an aeration apparatus installed below the membrane elements 31. The plurality of membrane elements 31 are housed in a casing with up-and-down two stages, and arranged at regular intervals such that each membrane surface has an upright posture.

Figure 4:
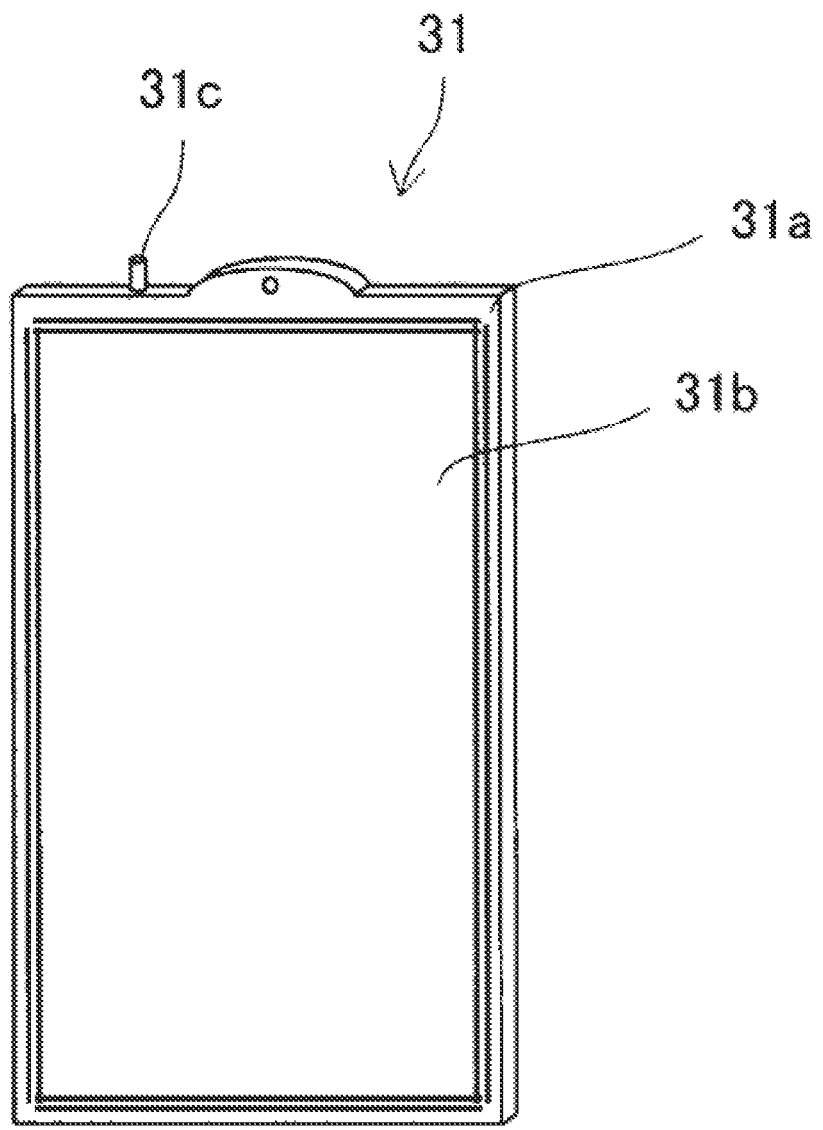
FIG. 4 is an explanatory diagram illustrating an example of a membrane element provided in a membrane separation device.

FIG. 4 shows the membrane element 31. The membrane element 31 is formed of a resin-made membrane support 31a which has a water collecting pipe 31c at an upper portion thereof, and a separation membrane 31b disposed on both of the front and back surfaces of the membrane support 31a. In the present embodiment, the separation membrane 31b is formed of a microfiltration membrane including a porous organic polymer membrane having a nominal pore diameter of about 0.4 μm a surface of a nonwoven fabric.

The types of the separation membrane 31b and the membrane element 31 are not limited to the above-described embodiments, but any type of separation membrane and any form of membrane element (hollow fiber membrane element, tubular membrane element, monolith membrane element, etc.) can be used.

Figure 5:
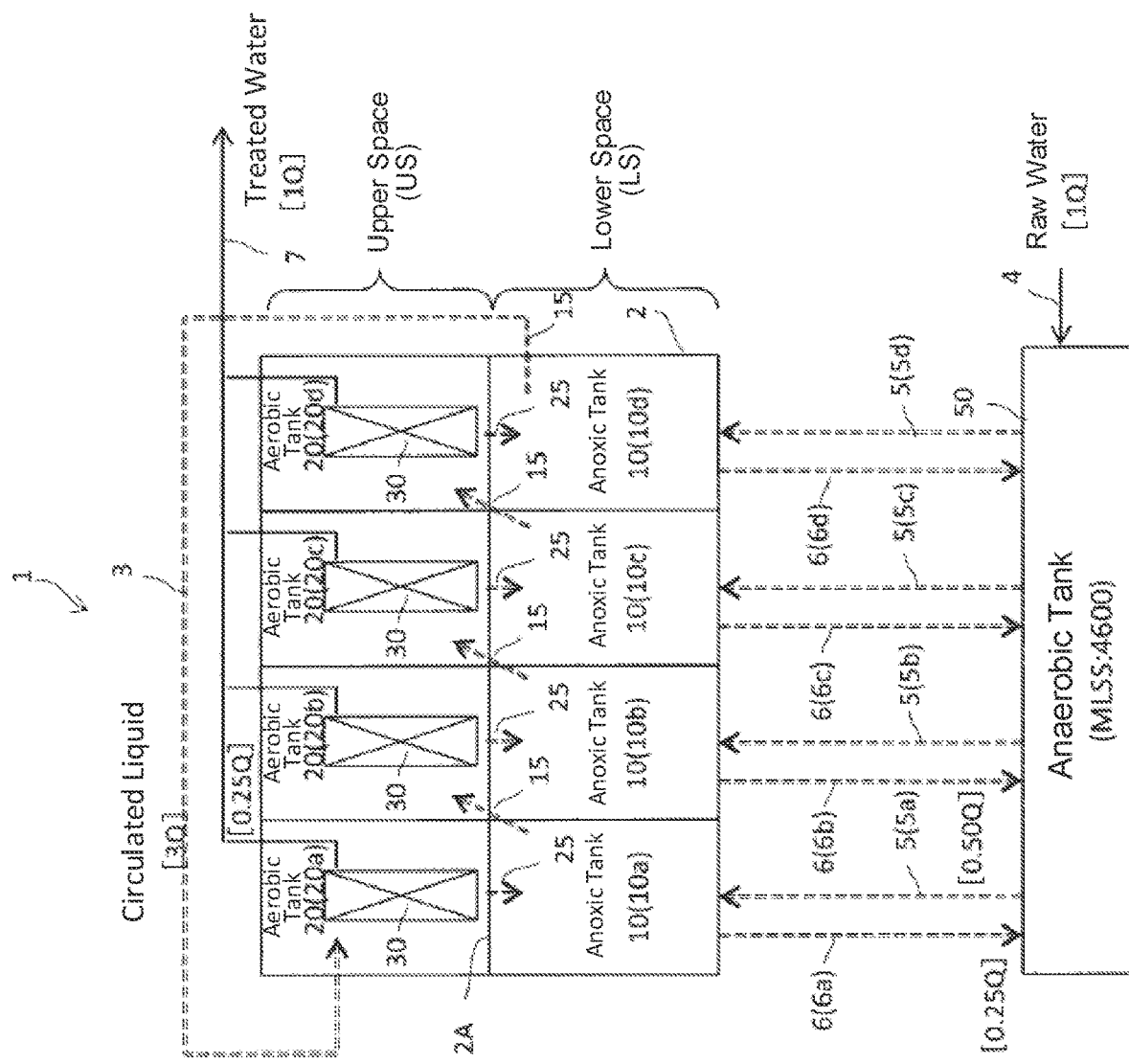
FIG. 5 is an explanatory diagram conceptually illustrating a wastewater treatment apparatus in accordance with another embodiment of the present invention.

As shown in FIG. 5, the wastewater treatment apparatus 1 may further include an anaerobic tank 50 for anaerobically treating the organic wastewater delivered via the raw water introduction path 4, a plurality of anaerobic tank return paths 6 (6a, 6b, 6c, 6d) for returning the activated sludge from the anoxic tanks 10 to the anaerobic tank 50, and a plurality of distribution paths 5 (5a, 5b, 5c, 5d) for dividing and supplying the activated sludge from the anaerobic tank 50 to the anoxic tanks 10.

By providing the anaerobic tank 50, even organic wastewater containing phosphorus can be effectively dephosphorized. In other words, phosphorus is efficiently discharged from the activated sludge in the anaerobic tank 50 by transferring the activated sludge, which has excessively absorbed phosphorus in the aerobic tanks 20, from the anoxic tanks 10 to the anaerobic tank 50 through the denitrifying liquid return paths 6. The activated sludge is then transferred to the anoxic tanks 10 through the distribution paths 5, and then to the aerobic tanks 20, in which phosphorus is excessively absorbed by the activated sludge, whereby the phosphorus concentration in the treated water after passing through the membrane separation devices 30 becomes very low.

Figure 6A:
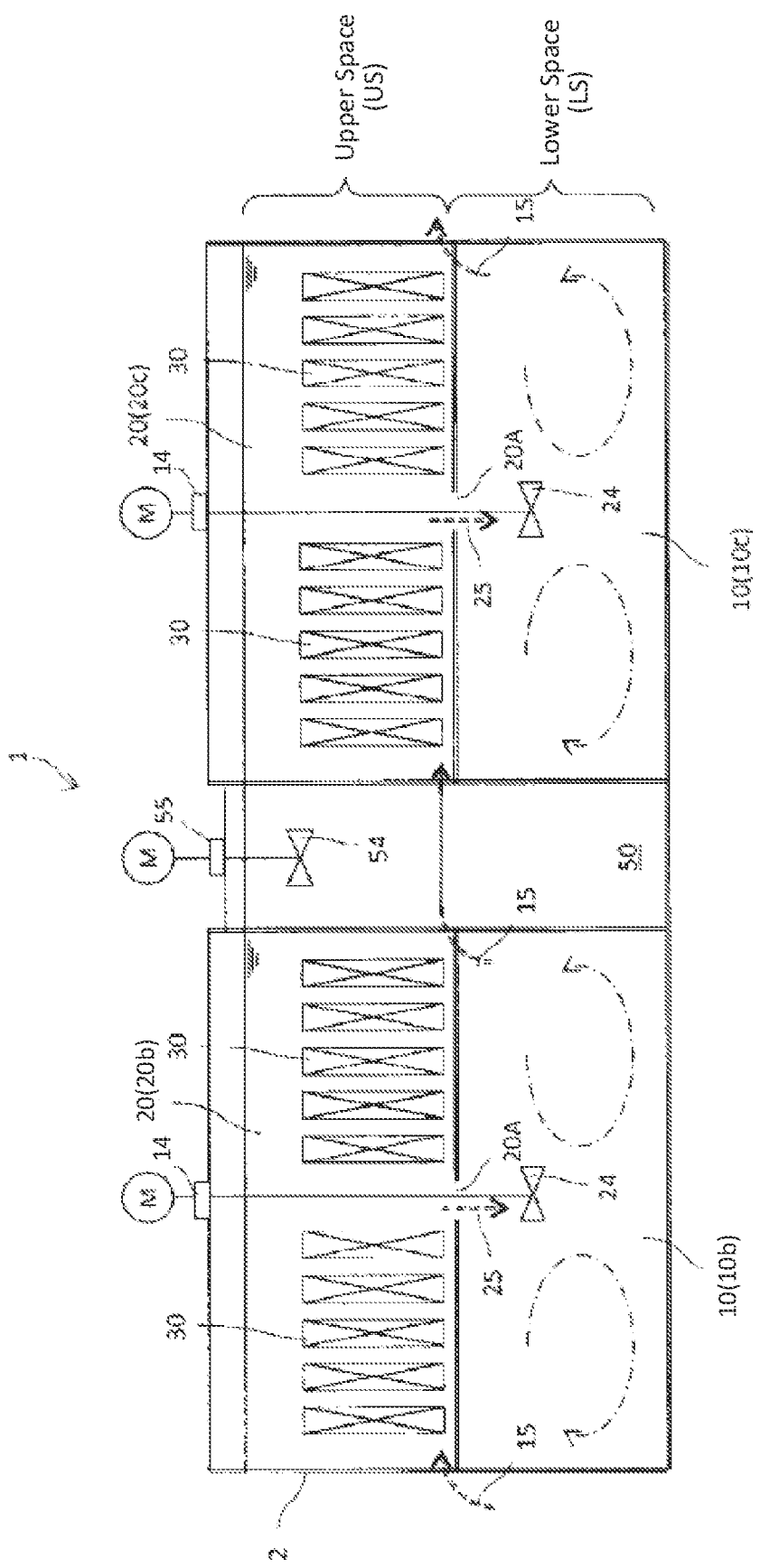
FIG. 6A is an explanatory diagram illustrating a front view of a wastewater treatment apparatus in accordance with another embodiment of the present invention.
Figure 6B:
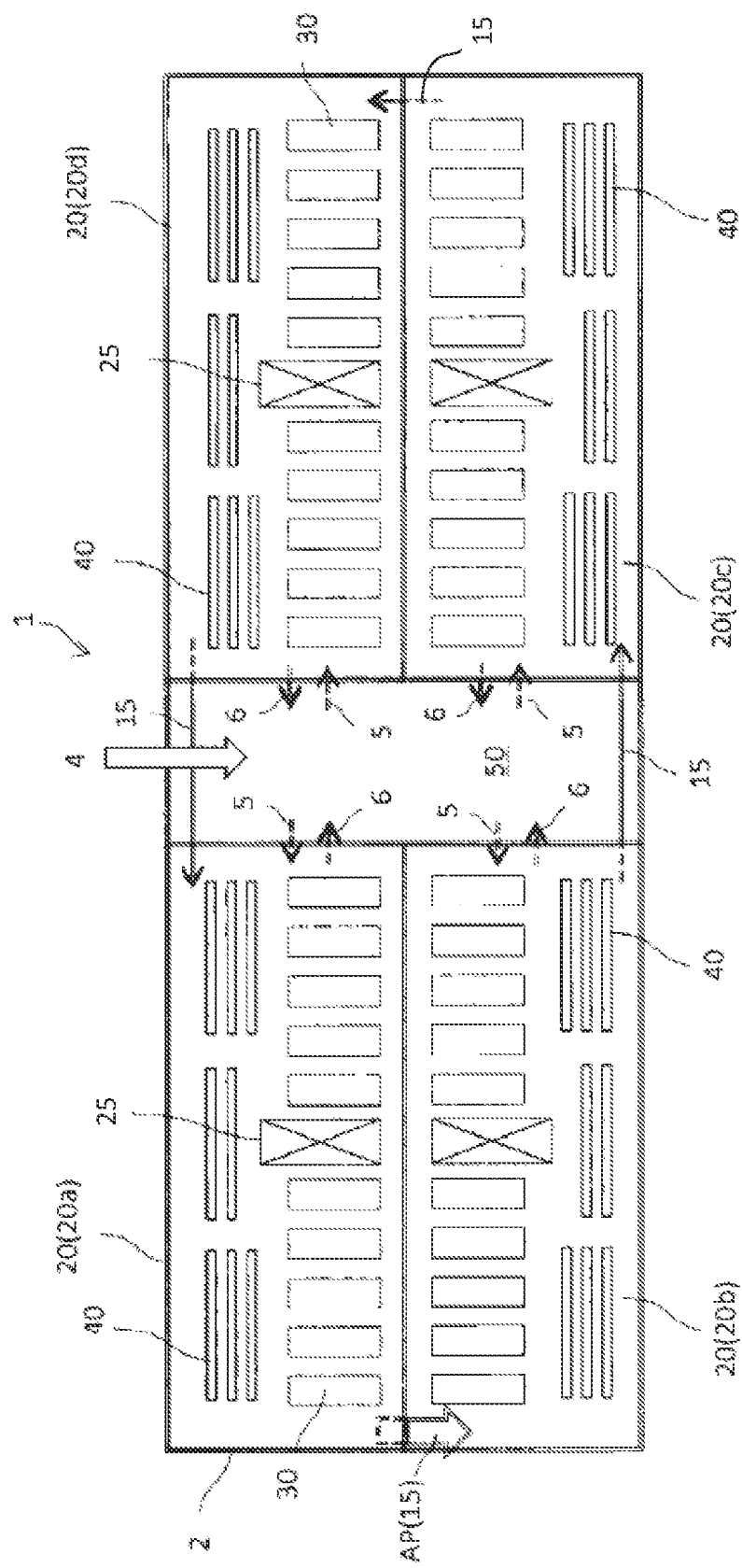
FIG. 6B is an explanatory diagram illustrating a plan view of the wastewater treatment apparatus shown in FIG. 6A.

FIGS. 6A and 6B show an example in which the anaerobic tank 50 is disposed in the center of the treatment tank 2 across the upper space US and the lower space LS. By arranging the anaerobic tank 50 in the center of the treatment tank 2, the distribution paths 5 and the denitrifying liquid return paths 6 which connect the anaerobic tank 50 and the plurality of anoxic tanks 10 can have the same and shortest length, thereby realizing the organic wastewater treatment apparatus 1 having a small installation area as a whole.

Figure 7A:
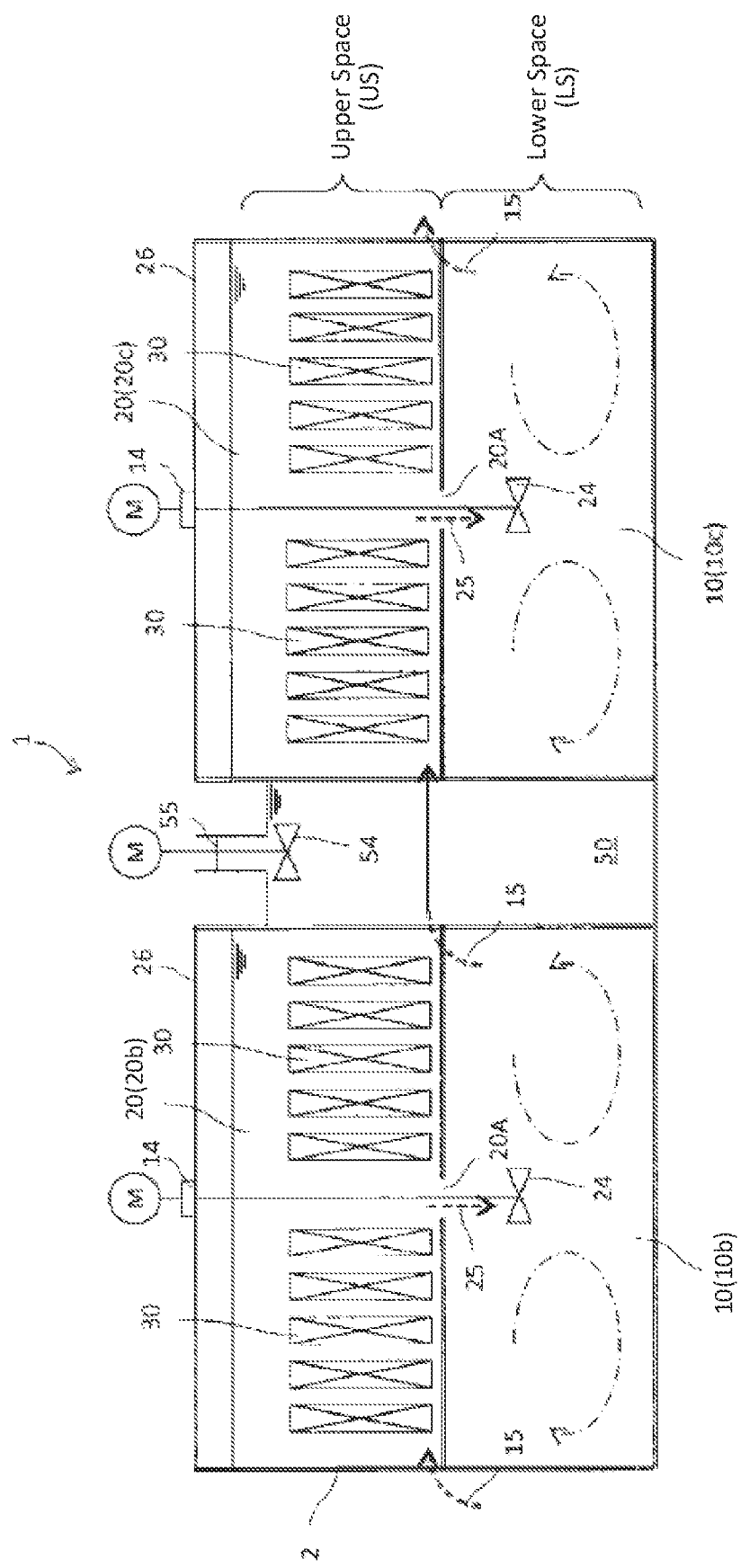
FIG. 7A is an explanatory diagram illustrating a front view of a wastewater treatment apparatus in accordance with yet another embodiment of the present invention.
Figure 7B:
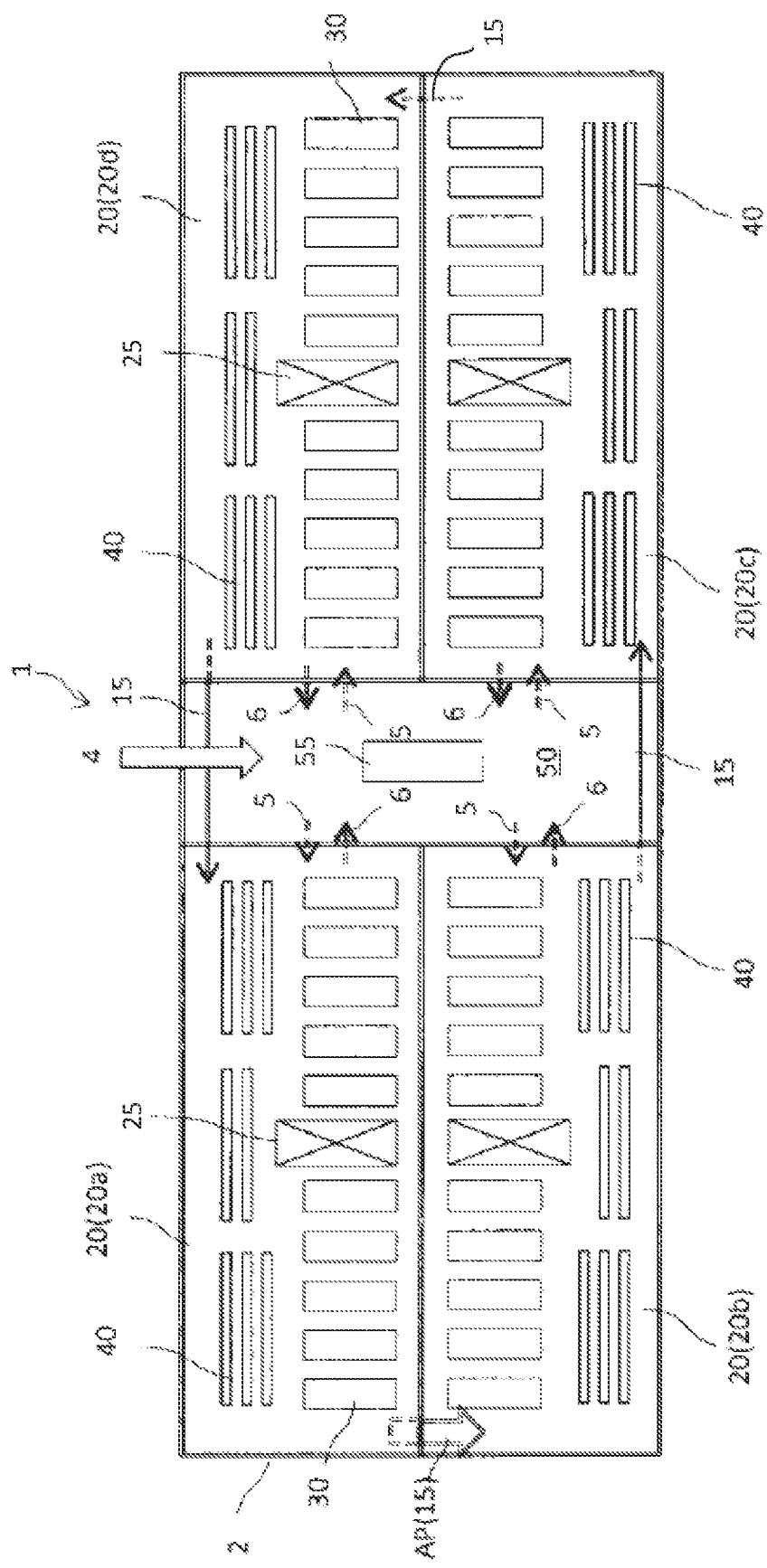
FIG. 7B is an explanatory diagram illustrating a plan view of the wastewater treatment apparatus shown in FIG. 7A.

As shown in FIGS. 7A and 7B, the anaerobic tank 50 may be covered with a lid having a rectangular opening 55, and an agitator blade 54 is removably attached and inserted through the rectangular opening 55, such that the agitator blade 54 agitates the raw water and the activated sludge inside the anaerobic tank 50. In the figures, the sign M represents a motor which drives the agitation blade 54. The lid covering the anaerobic tank 50 prevents contact with the outside air, while the lids 26 covering the aerobic tanks 20 prevent the odorous gas from being released into the atmosphere, and an odor collection duct (not shown) may be connected to the lids 26.

Figure 8A:
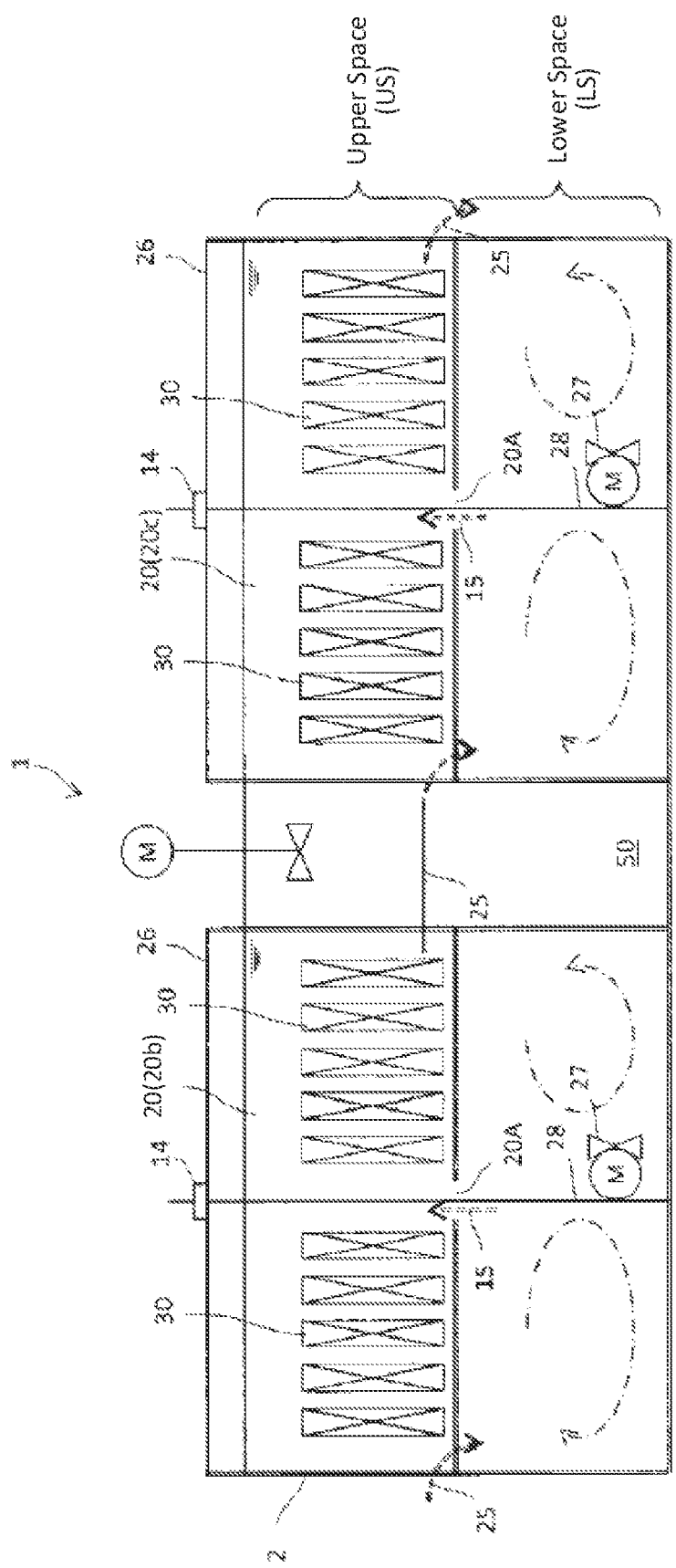
FIG. 8A is an explanatory diagram illustrating a front view of a wastewater treatment apparatus in accordance with yet another embodiment of the present invention.
Figure 8B:
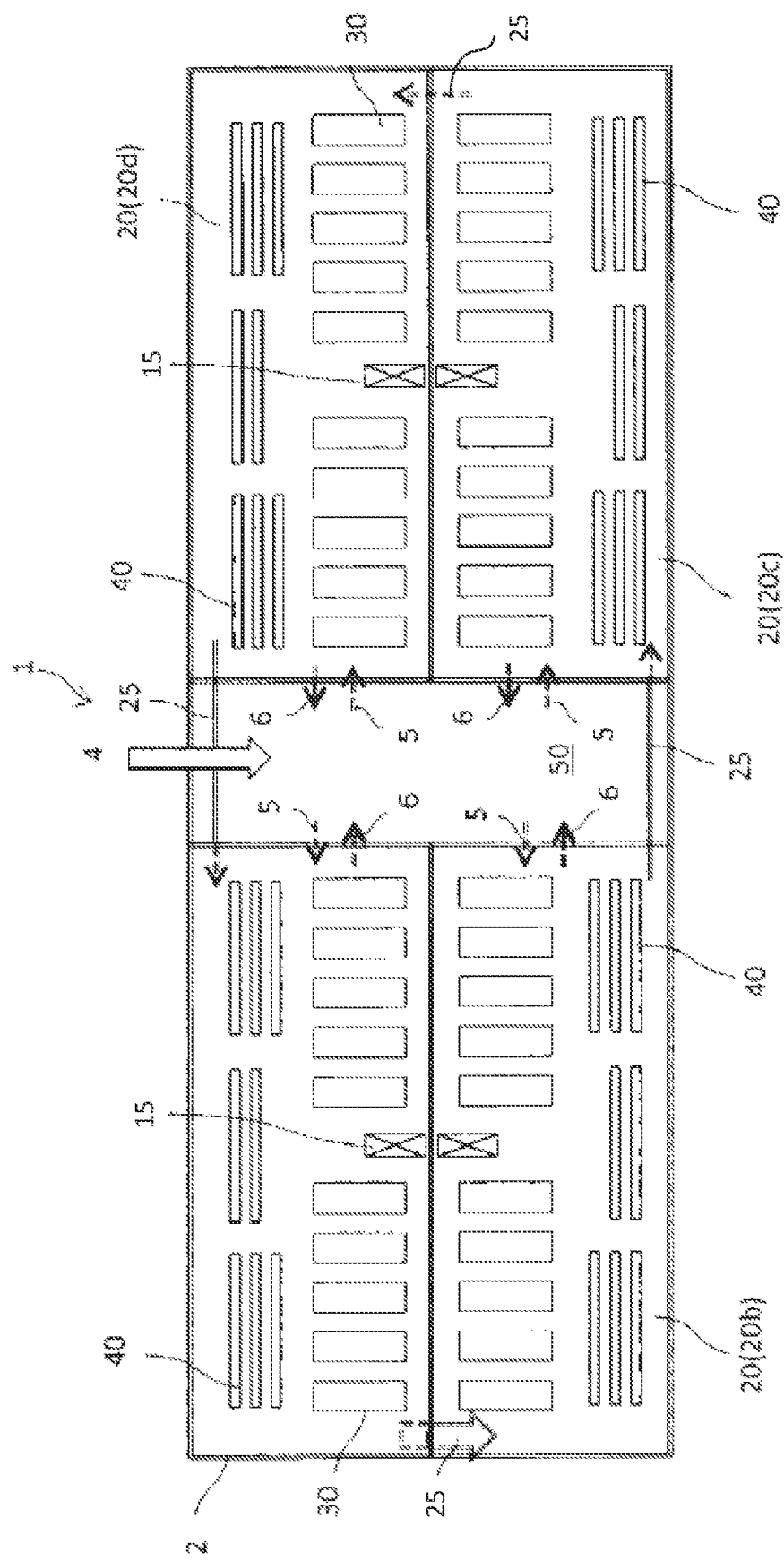
FIG. 8B is an explanatory diagram illustrating a plan view of the wastewater treatment apparatus shown in FIG. 8A.
Figure 9A:
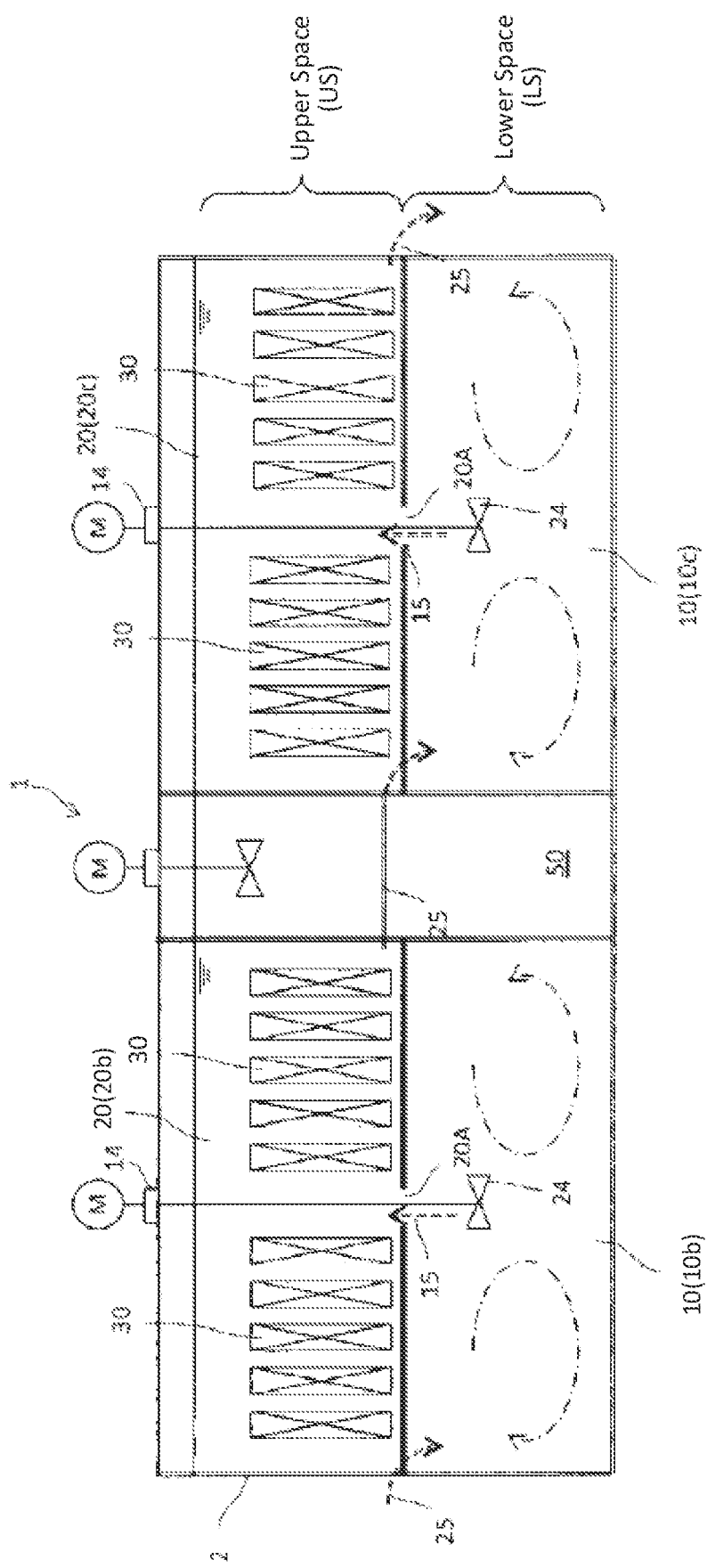
FIG. 9A is an explanatory diagram illustrating a front view of a wastewater treatment apparatus in accordance with yet another embodiment of the present invention.
Figure 9B:
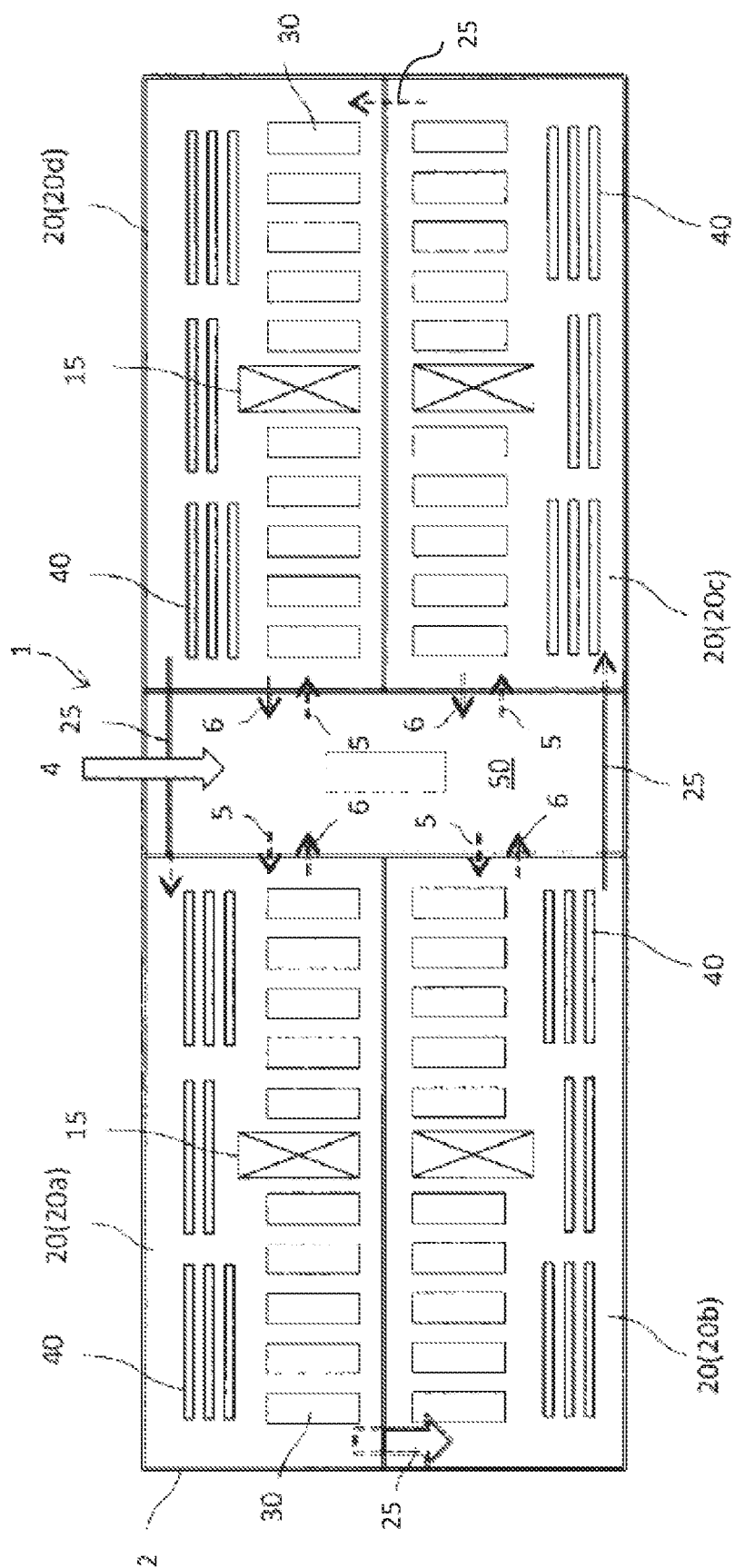
FIG. 9B is an explanatory diagram illustrating a plan view of the wastewater treatment apparatus shown in FIG. 9A.

FIGS. 8A and 8B illustrate another embodiment in which each anoxic tank 10 is provided with an underwater mixer 27. Each aerobic tank 20 is covered with the lid 26 having a rectangular opening 14, and a guide pipe 28 is disposed through the rectangular opening 14. The underwater mixer 27 is freely lifted and lowered via the guide pipe 28. The underwater mixer 27 agitates the raw water and the activated sludge inside the anoxic tank 10.

In the previous embodiments described in FIGS. 6A, 6B, 7A and 7B, the activated sludge is transferred from the aerobic tanks 20 (e.g., 20b) arranged in the upper space US to the anoxic tanks 10 (e.g., 10b) arranged in the lower space LS directly therebelow via the nitrifying liquid transfer paths 25, and then the activated sludge is transferred from the anoxic tanks 10 (e.g., 10b) to the aerobic tanks 20 (e.g., 20c) arranged in the upper space US above the adjacent anoxic tanks 10 (e.g., 10c) via the denitrifying liquid transfer paths 15. On the other hand, the wastewater treatment apparatus 1 in this embodiment is configured differently such that the activated sludge is transferred from the anoxic tanks 10 (e.g., 10b) arranged in the lower space LS to the aerobic tanks 20 (e.g., 20b) arranged in the upper space US directly thereabove via the denitrifying liquid transfer paths 15, and then the activated sludge is transferred from the aerobic tanks 20 (e.g., 20b) to the anoxic tanks 10 (e.g., 10c) arranged in the lower space LS below the adjacent aerobic tanks 20 (e.g., 20c) via the nitrifying liquid transfer paths 25. In other words, the openings 20A serve as the denitrifying liquid transfer paths 15 in the previous embodiments (FIGS. 6A, 6B, 7A, and 7B), while the openings 20A serve as the nitrifying liquid transfer paths 25 in this embodiment.

Similarly to FIGS. 8A and 8B, FIGS. 9A and 9B also illustrate another embodiment in which the flow direction of the activated sludge through the denitrifying liquid transfer path 15 and the nitrifying liquid transfer path 25 are in the opposite direction compared with that in FIGS. 6A and 6B. Either of these configurations may be employed.

In the above-described embodiments, the auxiliary diffuser 40 and the membrane separator 30 are provided within a single tank (each of 20a, 20b, 20c, and 20d) of the aerobic tank 20. However, each aerobic tank 20 may be divided into an aerobic compartment and a membrane separation compartment by a partition. In such a case, the activated sludge is transferred to the aerobic compartment via the denitrifying liquid transfer path 15, and after being transferred from the aerobic compartment to the membrane separation compartment, the activated sludge is transferred to the anoxic tank 10 via the nitrifying liquid transfer path 25.

In the above-described embodiments, mechanical agitators are used to agitate the activated sludge in the anoxic tanks 10. However, the activated sludge may be agitated by providing coarse bubble diffusers at the bottom of the anoxic tanks 10 and intermittently diffusing air therefrom. In such a case, since the agitating device does not have mechanical driving parts, the maintainability of the apparatus can be improved The above-described embodiments are all examples of the present invention, and the description does not limit the present invention, and the specific configuration of each part can be appropriately modified and designed within the range in which the effects of the present invention are exhibited. In addition, any one or more of the above-mentioned embodiments may be appropriately combined with each other.

What is claimed is:

1. An organic wastewater treatment apparatus for biologically treating organic wastewater containing nitrogen, comprising:
   a treatment tank in which activated sludge is stored;
   a top-bottom partition member for dividing the treatment tank in a vertical direction into an upper space and a lower space;
   a plurality of anoxic tanks formed in the lower space of the treatment tank;
   a plurality of aerobic tanks formed in the upper space of the treatment tank, each aerobic tank being provided with an immersion-type membrane separation device;
   a raw water supply path for dividing and supplying the organic wastewater to the plurality of anoxic tanks;
   a plurality of denitrifying liquid transfer paths for transferring the activated sludge from the anoxic tanks to the aerobic tanks;
   a plurality of nitrifying liquid transfer paths for transferring the activated sludge from the aerobic tanks to the anoxic tanks; and
   beam members provided on a lower surface of the top-bottom partition member,
   wherein each nitrifying liquid transfer path has an inlet provided on an upper surface of the anoxic tank, and each beam member has a through-hole such that a gas generated in the anoxic tank is released therethrough into the nitrifying liquid transfer path,
   and wherein the organic wastewater treatment apparatus is configured to repeatedly transfer the activated sludge from the anoxic tanks to the aerobic tanks via the denitrifying liquid transfer paths, and from the aerobic tanks to the anoxic tanks via the nitrifying liquid transfer paths, such that the activated sludge circulates throughout the treatment tank.

\* \* \* \* \*